(12) United States Patent
Larson et al.

(10) Patent No.: US 7,660,925 B2
(45) Date of Patent: Feb. 9, 2010

(54) BALANCING PCI-EXPRESS BANDWIDTH

(75) Inventors: Chad J. Larson, Austin, TX (US); Ricardo Mata, Jr., Pflugerville, TX (US); Michael A. Perez, Cedar Park, TX (US); Steven Vongvibool, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 11/736,024

(22) Filed: Apr. 17, 2007

(65) Prior Publication Data

US 2008/0263246 A1    Oct. 23, 2008

(51) Int. Cl.
  G06F 13/00    (2006.01)
  G06F 13/38    (2006.01)
(52) U.S. Cl. .................. 710/107; 710/104; 710/300
(58) Field of Classification Search .................. 710/107, 710/117
  See application file for complete search history.

(56) References Cited

U.S. PATENT DOCUMENTS

| | | | |
|---|---|---|---|
| 6,732,219 B1* | 5/2004 | Broyles | 710/316 |
| 6,918,001 B2* | 7/2005 | Fanning | 710/316 |
| 7,099,969 B2 | 8/2006 | McAfee et al. | |
| 7,136,953 B1* | 11/2006 | Bisson et al. | 710/307 |
| 7,197,591 B2 | 3/2007 | Kwa et al. | |
| 7,536,490 B2* | 5/2009 | Mao | 710/104 |
| 2003/0131179 A1* | 7/2003 | Ajanovic et al. | 710/316 |
| 2005/0088445 A1 | 4/2005 | Gonzalez et al. | |
| 2006/0031542 A1 | 2/2006 | Berreth | |
| 2006/0106955 A1* | 5/2006 | Wang et al. | 710/29 |
| 2006/0259656 A1 | 11/2006 | Sullivan | |
| 2006/0271713 A1 | 11/2006 | Xie et al. | |
| 2007/0239925 A1 | 10/2007 | Koishi | |
| 2008/0005706 A1 | 1/2008 | Sharma et al. | |
| 2008/0022024 A1* | 1/2008 | Mao | 710/104 |
| 2008/0022181 A1 | 1/2008 | Belogolovy | |
| 2008/0256400 A1 | 10/2008 | Yang et al. | |
| 2008/0263246 A1 | 10/2008 | Larson et al. | |

OTHER PUBLICATIONS

U.S. Appl. No. 11/866,472, filed Oct. 3, 2007, Larson et al.
U.S. Appl. No. 11/375,493, filed Mar. 14, 2006, Hua et al.

* cited by examiner

*Primary Examiner*—Ryan M Stiglic
(74) *Attorney, Agent, or Firm*—Stephen J. Walder, Jr.; Diana R. Gerhardt

(57) ABSTRACT

Mechanisms for balancing bus bandwidth across a plurality of PCI-Express (PCIe) endpoints are provided. Firmware automatically operates in concert with established data structures to set operational parameters of the PCIe endpoints so as to maximize usage of the available bandwidth of a front-side bus while minimizing isochronous issues and the likelihood that the performance of the PCIe endpoints cannot be guaranteed. A first table data structure comprises various combinations of operational parameter settings for controlling bandwidth usage of each of the endpoints of the data processing system. A second table data structure contains a listing of the endpoints that the data processing system supports with their associated minimum data rates, priorities, and whether the endpoints have isochronous requirements. A setting of the desired bandwidth balancing level is used along with these data structures to determine how to adjust the operating parameters of the PCIe endpoints.

35 Claims, 8 Drawing Sheets

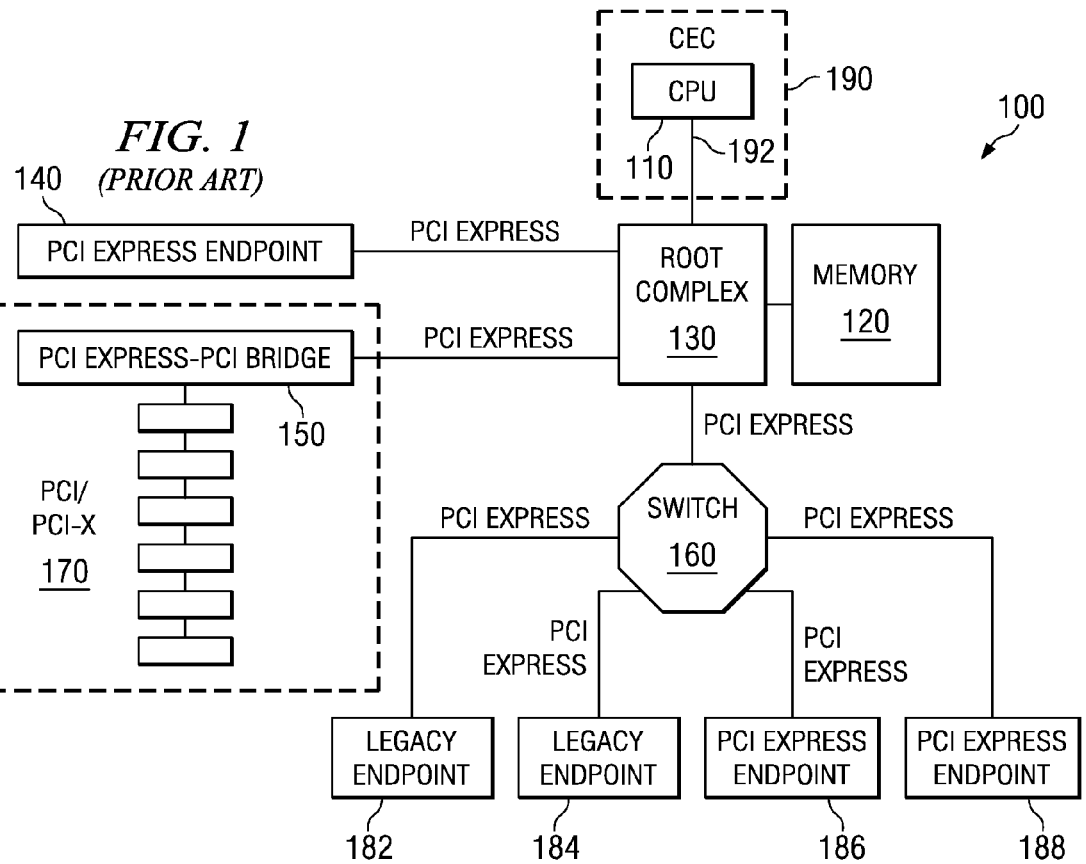
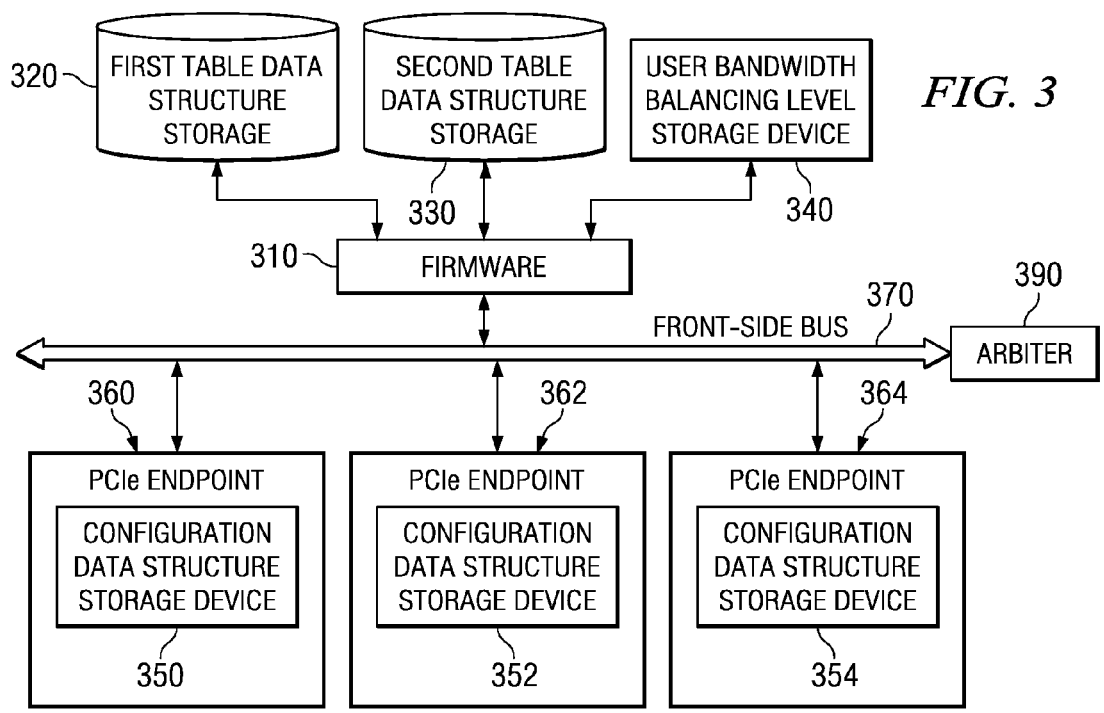

READS FOR PCIe x1

| PAYLOAD | MMRS | MBYTES/SEC |
|---|---|---|
| 128 | 4096 | 200 |
| 256 | 4096 | 220 |
| 512 | 4096 | 240 |
| 128 | 512 | 180 |
| 256 | 512 | 200 |
| 512 | 512 | 220 |
| 128 | 128 | 175 |

READS FOR PCIe x2

| PAYLOAD | MMRS | MBYTES/SEC |
|---|---|---|
| 128 | 4096 | 400 |
| 256 | 4096 | 440 |
| 512 | 4096 | 480 |
| 128 | 512 | 360 |
| 256 | 512 | 400 |
| 512 | 512 | 440 |
| 128 | 128 | 350 |

READS FOR PCIe x4

| PAYLOAD | MMRS | MBYTES/SEC |
|---|---|---|
| 128 | 4096 | 800 |
| 256 | 4096 | 880 |
| 512 | 4096 | 960 |
| 128 | 512 | 720 |
| 256 | 512 | 800 |
| 512 | 512 | 880 |
| 128 | 128 | 700 |

*FIG. 4D*

READS FOR PCIe x8

| PAYLOAD | MMRS | MBYTES/SEC |
|---|---|---|
| 128 | 4096 | 1600 |
| 256 | 4096 | 1760 |
| 512 | 4096 | 1920 |
| 128 | 512 | 1440 |
| 256 | 512 | 1600 |
| 512 | 512 | 1760 |
| 128 | 128 | 1400 |

*FIG. 4E*

WRITES ONLY

| PAYLOAD | LANE | MBYTES/SEC |
|---|---|---|
| 128 | x1 | 200 |
| 256 | x1 | 220 |
| 512 | x1 | 240 |
| 128 | x2 | 400 |
| 256 | x2 | 440 |
| 512 | x2 | 480 |
| 128 | x4 | 800 |
| 256 | x4 | 880 |
| 512 | x4 | 960 |
| 128 | x8 | 1600 |
| 256 | x8 | 1720 |
| 512 | x8 | 1920 |

*FIG. 4F*

| PRIORITY | VENDOR ID | DEVICE ID | SUBSYSTEM VENDOR ID | SUBSYSTEM DEVICE ID | CLASS | SUBCLASS | IDEAL DATA RATE | MINIMUM DATA RATE | ISOCHRONOUS | DESCRIPTION |
|---|---|---|---|---|---|---|---|---|---|---|
| 1 | 1312 | 4328 | 0000 | 0000 | DISPLAY | 3D | 500 | 500 | YES | 3D GRAPHICS CARD |
| 2 | 1014 | 0017 | 0000 | 0000 | NETWORK | ETHERNET | 2000 | 1000 | NO | 10 GIGABIT ETHERNET |
| 2 | 8086 | 0321 | 8086 | 1234 | NETWORK | ETHERNET | 400 | 200 | NO | DUAL 1G ETHERNET |
| 3 | 4030 | 000a | 1014 | 0100 | BRIDGE | PCIE-PCIX | 800 | 400 | NO | FIBRE CHANNEL |
| 4 | 4030 | 000a | 1014 | 0200 | BRIDGE | PCIE-PCIX | 100 | 100 | NO | USB |
| 5 | 1014 | 000a | 1014 | 000a | STORAGE | SCSI | 700 | 500 | NO | U320 SCSI |
| 5 | 4353 | 4376 | 0000 | 0000 | STORAGE | IDE | 200 | 200 | NO | IDE |
| 6 | 3232 | 4532 | 0000 | 0000 | NETWORK | ISDN | 100 | 100 | NO | ISDN |

*FIG. 5*

BALANCING PCI-EXPRESS BANDWIDTH

BACKGROUND

1. Technical Field

The present application relates generally to an improved data processing system and method. More specifically, the present application is directed to a system and method for balancing PCI-Express Bandwidth across a plurality of PCI-Express adapters.

2. Description of Related Art

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI-Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links which are connected to exactly two devices.

FIG. 1 is an exemplary diagram illustrating a PCI-Express (PCIe) fabric topology in accordance with the PCIe specification. As shown in FIG. 1, the PCIe fabric topology 100 is comprised of a host processor (CPU) complex 110 and memory 120 coupled to a root complex or multi-root complex 130, i.e. an I/O North Bridge, which is in turn coupled to one or more of a PCIe endpoint 140 (the term "endpoint" is used in the PCIe specification to refer to PCIe enabled I/O adapters), a PCI express to PCI bridge 150, and one or more interconnect switches 160. The root complex 130 denotes the root of an I/O hierarchy that connects the CPU/memory to the I/O adapters. The root complex 130 includes a host bridge, zero or more root complex integrated endpoints, zero or more root complex event collectors, and one or more root ports. Each root port supports a separate I/O hierarchy. The I/O hierarchies may be comprised of a root complex 130, zero or more interconnect switches 160 and/or bridges 150 (which comprise a switch or PCIe fabric), and one or more endpoints, such as endpoints 170 and 182-188. The endpoints 140, 170, and 182-188 may be, for example, Ethernet, SCSI, SAS, or Fibre Channel I/O adapters. For more information regarding PCI and PCIe, reference is made to the PCI and PCIe specifications available from the peripheral component interconnect special interest group (PCI-SiG) website at www.pcisig.com.

The CPU complex 110 comprises one or more processors and memories (not shown) and resides in a Central Electronics Complex (CEC) 190 above the root complex 130. To connect the CEC 190 to the root complex(es) 130, buses 192 are used that are sometimes referred to as font-side buses, e.g., in International Business Machines Corporation (IBM) enterprise servers, these buses are referred to as the GX+buses. The front-side bus 192 has a limited bandwidth that is a known quantity. For example, a front-side bus 192 may be able to sustain 4 Gbytes/sec of bandwidth.

In the currently known configurations, it is possible to string several drawers with endpoints 140, 170, and 182-188 whose total bandwidth can be over the 4 Gbytes/sec bandwidth available on the front-side bus 192 if their PCIe lanes are used to their maximum levels. A "lane" in the PCI standard is a set of differential signal pairs, one pair for transmission and one pair for reception. A "by-N" link in the PCI standard is composed of N lanes, e.g., an "×8" link or slot supports 8 lanes of traffic to/from an I/O adapter. If the traffic via the PCIe lanes of the endpoints exceeds the available bandwidth of the front-side bus 192, it cannot be guaranteed that the desired performance for each I/O adapter will be achieved and issues may arise with isochronous I/O adapters, i.e. I/O adapters whose data transmissions have data packets that are transmitted at an equal time difference between data packet transmissions, e.g., data transmissions associated with time-dependent data, such as real-time voice and video.

PCI-Express attempted to resolve this issue by creating traffic classes and virtual lanes where one can define which traffic has priority and how much buffer space each lane can use. The problem with this solution is that the industry has not attempted to take advantage of this architectural feature. The industry has not attempted to take advantage of multiple traffic classes and virtual lanes because the transition from PCI-X to PCI-Express was to be performed in as transparent a manner as possible with regard to the operating system and firmware. In order to fully take advantage of traffic classes and virtual lanes, the operating system and firmware would have to be aware of these features and new code would need to be written to take advantage of these features. However, rather than making such modifications, Basic Integrated Operating Systems (BIOS) and known operating systems, such as Microsoft Windows and Linux, have not made the necessary modifications to support the multiple traffic classes and virtual lanes.

Moreover, from a hardware standpoint, adding support for multiple traffic classes and multiple virtual lanes requires added complexity to the chip areas such as arbitration and flow control. Furthermore, adding such support requires additional chip real estate since each virtual lane would require its own private storage for sending and receiving data. As a result, hardware manufacturers have not implemented support for multiple virtual lanes and multiple traffic classes.

Rather than taking advantage of multiple traffic classes and virtual lanes, existing PCI-Express adapters only support one virtual channel and one traffic class. Moreover, the primary operating systems, i.e. Microsoft Windows and Linux, only use one traffic channel and one virtual lane. As a result, currently known environments often encounter problems where the total possible bandwidth of a set of PCI-Express adapter cards within an I/O drawer attached to a CPU complex via an I/O hub or switch may far exceed the capabilities of the I/O hub, switch, and/or the front-side bus.

SUMMARY

The illustrative embodiments provide a system and method for balancing bus bandwidth across a plurality of PCI-Express (PCIe) adapters or "endpoints." The mechanisms of the illustrative embodiments include firmware, hardware, or software mechanisms, and data structures, which automatically operate in concert to set operational parameters of the PCIe adapters/endpoints so as to maximize usage of the available bandwidth of a front-side bus while minimizing the likelihood that the performance of the PCIe adapters/endpoints cannot be guaranteed and minimizing issues with isochronous PCIe adapters/endpoints.

In one illustrative embodiment, two table data structures are utilized by firmware to adjust operating parameters of PCIe adapters/endpoints (hereafter referred to as endpoints) based on a comparison of the total maximum and/or minimum data rates of the endpoints to the maximum data rate for the front-side bus, i.e. the bandwidth of the front-side bus. A first table data structure comprises various combinations of operational parameter settings for controlling bandwidth usage of each of the endpoints of the data processing system. The second table data structure contains a listing of the endpoints that the data processing system supports with their associated minimum data rates and priorities. The second table data structure further points out which endpoints have isochronous requirements. In addition, a setting of the desired level to which the mechanisms of the illustrative embodiments are to be implemented in a particular data processing system is identified and used to determine how to adjust the operating parameters.

In operation, the mechanisms of the illustrative embodiments determine the maximum data rate for the front-side bus and query all of the currently attached endpoints to determine what each endpoint's maximum lane, maximum memory read size (MMRS), and payload are. The firmware then uses the first table data structure, based on the maximum lane, MMRS, and payload values, to determine the maximum data rate for each endpoint in order to come up with a total maximum data rate for all endpoints. Having determined the total maximum data rate for all of the endpoints, the firmware compares the maximum data rate for all of the endpoints to the maximum data rate for the front-side bus. Based on results of the comparison, the operational parameters for the particular endpoints are either left alone or adjusted based on the user selected level of bandwidth balancing, in order to achieve a desired performance of the data processing system. The determination of the setting of the operational parameters may further be based on the minimum data rates of the endpoints and whether endpoints have isochronous requirements as specified by the second table data structure.

In one illustrative embodiment, a method for balancing a bandwidth of a front-side bus of the data processing system across a plurality of endpoints coupled to the data processing system is provided. The method may comprise determining a maximum data rate of the front-side bus, determining a total maximum data rate of the plurality of endpoints, and comparing the total maximum data rate of the plurality of endpoints to the maximum data rate of the front-side bus. The method may further comprise, in response to the total maximum data rate of the plurality of endpoints being greater than the maximum data rate of the front-side bus, retrieving minimum data rates for the plurality of endpoints and setting operational parameters of the plurality of endpoints based on minimum data rates of the plurality of endpoints. Determining a maximum data rate of the front-side bus may comprise at least one of retrieving a maximum data rate value from a register of the data processing system that stores the maximum data rate value or receiving a value corresponding to the maximum data rate of the front-side bus as part of vital product data.

Determining a total maximum data rate of the plurality of endpoints may comprise querying each of the endpoints in the plurality of endpoints for their current operational parameter settings, determining a maximum data rate for each endpoint of the plurality of endpoints based on their current operational parameter settings, and calculating the total maximum data rate as a sum of the maximum data rates for each of the endpoints of the plurality of endpoints. Querying each of the endpoints in the plurality of endpoints may comprise obtaining the operational parameter settings of an endpoint from industry standard registers whose values are populated in response to a slot corresponding to the endpoint being powered on.

Determining a maximum data rate for each endpoint of the plurality of endpoints based on their current operational parameter settings may comprise performing, for each of the endpoints in the plurality of endpoints, a lookup operation using a first data structure identifying a correlation between settings of one or more operational parameters and a maximum data rate. The first data structure may be a three-dimensional data structure correlating a number of lanes operational parameter, a payload size operational parameter, and a maximum memory read size operational parameter with a maximum data rate.

The method may further comprise setting operational parameters of each endpoint of the plurality of endpoints to values corresponding to each endpoint's maximum data rate, if the total maximum data rate of the plurality of endpoints is less than or equal to the maximum data rate of the front-side bus. Retrieving minimum data rates for the plurality of endpoints may comprise performing, for each of the endpoints in the plurality of endpoints, a lookup operation using a second data structure identifying a correlation between endpoint type, endpoint priority, minimum data rate, and whether an endpoint has isochronous requirements.

Setting operational parameters of the plurality of endpoints based on minimum data rates of the plurality of endpoints may comprise retrieving a user bandwidth balancing level value and determining an adjusted data rate for the front-side bus based on the maximum data rate of the front-side bus and the user bandwidth balancing level value. Setting the operational parameters may further comprise comparing a total of the minimum data rates of the plurality of endpoints with the adjusted data rate for the front-side bus and setting the operational parameters of the plurality of endpoints based on a result of the comparison of the total of the minimum data rates of the plurality of endpoints with the adjusted data rate for the front-side bus.

If the total of the minimum data rates of the plurality of endpoints is less than or equal to the adjusted data rate for the front-side bus, setting operational parameters of the plurality of endpoints based on the result of the comparison of the total of the minimum data rates of the plurality of endpoints with the adjusted data rate for the front-side bus may comprise setting the operational parameters for each endpoint by performing a lookup operation in a first data structure, identifying a correlation between settings of one or more operational parameters and a data rate, based on a minimum data rate corresponding to the endpoint. If the total of the minimum data rates of the plurality of endpoints is greater than the adjusted data rate for the front-side bus, setting operational parameters of the plurality of endpoints based on the result of the comparison of the total of the minimum data rates of the plurality of endpoints with the adjusted data rate for the front-side bus may comprise setting operational parameters for each endpoint based on a lookup operation in the first data structure using a corresponding minimum data rate and sending an error message to an administrator data processing device indicating a problem in configuring the data processing system.

If the total of the minimum data rates of the plurality of endpoints is greater than the adjusted data rate for the front-side bus, setting operational parameters of the plurality of endpoints based on the result of the comparison of the total of the minimum data rates of the plurality of endpoints with the adjusted data rate for the front-side bus may comprise generating a priority listing of the endpoints in the plurality of endpoints based on priority information retrieved from a second data structure identifying endpoint priority and reducing resources allocated to the endpoints based on the priority listing until a total minimum data rate of the plurality of endpoints is less than or equal to the adjusted data rate for the front-side bus. The method may be implemented in firmware of the data processing system.

The method may further comprise identifying one or more endpoints in the plurality of endpoints that have isochronous requirements based on the second data structure and determining if the one or more endpoints have a highest priority based on the second data structure. A bus arbiter may be set such that the one or more endpoints are given priority to the front-side bus over other endpoints of the plurality of endpoints. The method may further comprise determining a time to process a payload size corresponding to the operational parameter setting for the one or more endpoints based on the first data structure and determining an ideal payload size for the plurality of endpoints to compensate for the isochronous requirements of the one or more endpoints. Operational parameters of endpoints in the plurality of endpoints whose payload size setting is greater than the ideal payload size may be adjusted.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a data processing system is provided. The system may be comprised of firmware, a front-side bus, and a plurality of endpoints coupled to the firmware and the front-side bus. The firmware may comprise instructions which, when executed, cause the firmware to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an exemplary diagram illustrating a PCI-Express (PCIe) fabric topology in accordance with the PCIe specification;

FIG. 3 is an exemplary diagram of the primary operational components of the illustrative embodiments;

FIGS. 4A-4E are exemplary diagrams of a first three-dimensional table data structure for identifying possible combinations of operational parameters for balancing bandwidth across PCIe endpoints in accordance with one illustrative embodiment;

FIG. 4F is an exemplary diagram of a two-dimensional table data structure that may be used for Write operations of PCIe endpoints in accordance with one illustrative embodiment;

FIG. 5 is an exemplary diagram of a second table data structure for identifying supported PCIe endpoints and whether the PCIe endpoints have isochronous requirements;

DETAILED DESCRIPTION OF THE
ILLUSTRATIVE EMBODIMENTS

Figure 2:
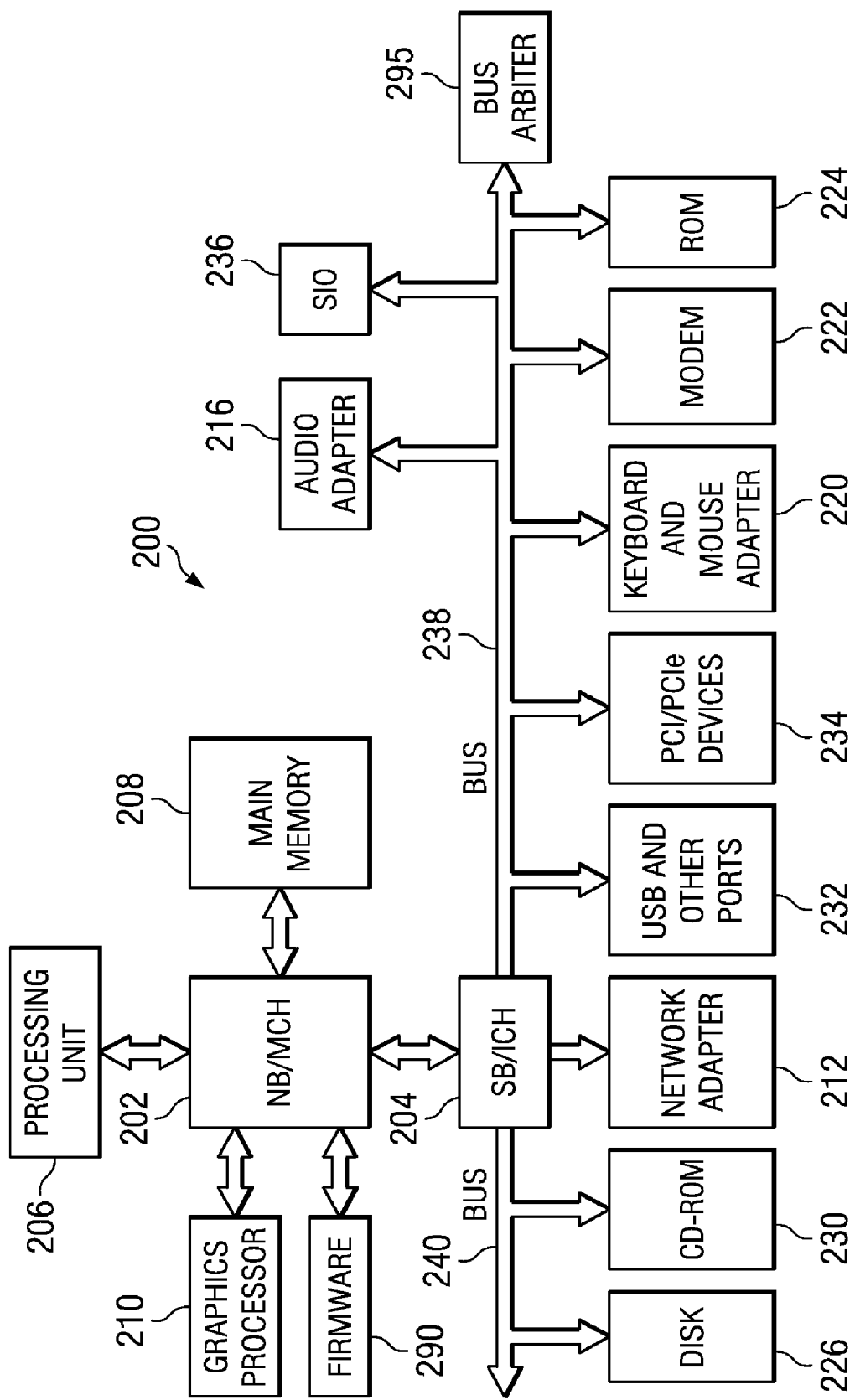
FIG. 2 is a block diagram of an exemplary data processing system in which aspects of the illustrative embodiments may be implemented.

The illustrative embodiments provide a mechanism for balancing the bandwidth of a front-side bus across a plurality of PCI-Express (PCIe) adapters, or "endpoints," so as to achieve an optimum performance of the data processing system even when the PCIe endpoints support only a single virtual channel and traffic class. The mechanisms of the illustrative embodiments may be implemented in a data processing system that itself implements the PCIe fabric topology of FIG. 1 or a similar PCIe fabric topology. FIG. 2 is provided as one exemplary block diagram of a data processing system in which the exemplary aspects of the illustrative embodiments may be implemented. It should be appreciated that FIG. 2 is only exemplary and is not intended to assert or imply any limitation with regard to the data processing environments in which aspects or embodiments of the present invention may be implemented. Many modifications to the depicted environment may be made without departing from the spirit and scope of the present invention.

With reference now to FIG. 2, a block diagram of an exemplary data processing system is shown in which aspects of the illustrative embodiments may be implemented. Data processing system 200 is an example of a computer in which computer usable code or instructions implementing the processes for illustrative embodiments of the present invention may be located. The computer usable code or instructions may be provided in software of firmware. Moreover, in some illustrative embodiments, the mechanisms of the illustrative embodiments may be provided as hardware elements of the data processing system of FIG. 2.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2.

As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With particular importance to the illustrative embodiments set forth herein, the data processing system 200 of FIG. 2 includes firmware 290 and bus arbiter 295. The bus arbiter 295 is used to arbitrate access, to the bus 238 and thus, the north bridge/memory controller hub (NB/MCH) 202, by the PCI/PCIe devices 234, which constitutes the front-side bus of the PCIe fabric topology. The bus arbiter 295 operates based on the setting of operational parameters for the various PCI/PCIe devices 234 made by the firmware 290. The firmware 290 performs operations, in accordance with the illustrative embodiments as set forth hereafter, to balance the bandwidth of the bus 238 and NB/MCH 202 across the PCI/PCIe devices 234. While the illustrative embodiments will be described with regard to the functionality being performed in firmware 290, it should be appreciated that the functionality of the illustrative embodiments may be implemented in software or hardware. That is, software instructions for performing the functionality may be provided and executed by one or more processors. Moreover, in other illustrative embodiments, one or more integrated circuit devices may be provided for performing this functionality in circuitry.

As a further example, the functionality of the illustrative embodiments may be provided in one or more layers of firmware 290. For example, the BIOS that initiates the system and the real-time abstraction layer that handles requests during runtime may each be used to perform various ones or combinations of the functions and operations described hereafter. As an example, a real-time request by the operating system to power on/off a PCIe slot (hotplug) may be handled by the real-time abstraction services (RTAS) part of firmware with a hypervisor level of firmware managing and overseeing the functions and operations performed by the RTAS.

The illustrative embodiments provide a system and method for balancing bus bandwidth across a plurality of PCI-Express (PCIe) adapters or "endpoints," which may be PCI/PCIe devices 234, for example. The mechanisms of the illustrative embodiments include firmware, hardware, or software mechanisms, and data structures, which automatically operate in concert to set operational parameters of the PCIe adapters/endpoints so as to maximize usage of the available bandwidth of a front-side bus, e.g., bus 238 and NB/MCH 202, while minimizing the likelihood that the performance of the PCIe adapters/endpoints cannot be guaranteed and minimizing issues with isochronous PCIe adapters/endpoints.

The illustrative embodiments take advantage of the fact that there are basically three ways to adjust data rates for PCIe so as to provide bandwidth balancing across PCIe endpoints. One option for balancing bandwidth is to adjust the number of lanes of a PCIe endpoint, e.g., ×1, ×2, ×4, ×8, or ×16. These lanes are like data pipes where a larger size pipe will provide a larger flow of data than can be sent at any given time. In current technology, each lane of a PCIe endpoint can send 250 Mbytes/sec in each direction. Thus, an ×8 endpoint, i.e. an endpoint having 8 lanes, can send 2 GBytes/sec in each direction.

A second way in which bandwidth may be adjusted for bandwidth balancing is to adjust the maximum payload setting. PCIe sends data via data packets which carry payloads. The maximum size of these payloads may be adjusted so as to increase or decrease the rate at which data is transmitted across the bus. For example, the maximum payload for PCIe data packets may be set to 128, 256, 512, 1024, 2048, or 4096 bytes depending upon the desired bandwidth usage.

A third way in which bandwidth may be adjusted for bandwidth balancing is to adjust the maximum memory read size (MMRS). The MMRS is the maximum amount of data that an endpoint may request from main memory 208 at a given time and may be, for example, 64, 128, 256, 512, 1024, 2048, or 4096 bytes. By modifying the MMRS, one effectively changes the amount of data that a PCIe endpoint may be read from main memory at a given time. These operational parameters, number of lanes, payload size, and MMRS, are used by the mechanisms of the present invention, along with a user selected bandwidth balancing level, endpoint priorities, minimum data rates of the endpoints, and isochronous requirements of the endpoints, to adjust the bandwidth usage of the various PCIe endpoints so as to achieve an optimum performance of the data processing system even when the bandwidth usage of the PCIe endpoints may exceed the available bandwidth of the front-side bus 238 and NB/MCH 202.

In one illustrative embodiment, two table data structures are provided in memory (not shown) associated with the firmware 290 and are utilized by firmware 290 to adjust the operating parameters of PCIe adapters/endpoints (hereafter referred to simply as endpoints) based on a comparison of the total maximum and/or minimum data rates of the endpoints to the maximum data rate for the front-side bus, e.g., the bandwidth of the front-side bus 238 and NB/MCH 202. A first table data structure comprises a three-dimensional table that shows the data rates for combinations of maximum memory read size (MMRS), payload, and lane settings. This first table data structure further identifies how long it takes, such as in nsecs, to complete a data transfer, which is important to isochronous PCIe endpoints, as discussed hereafter. The second table data structure contains a list of the PCIe endpoint types that the data processing system supports with their associated minimum data rates and priorities. The second table data structure further points out which PCIe endpoint types have isochronous requirements, e.g., video PCIe endpoints types that need access every x amount of time to stream video data. These table data structures may be provided by and modified by, for example, a super administrator, i.e. an administrator having knowledge beyond the typical administrator, e.g., an engineer with a background in PCIe or a lab support person.

Moreover, a setting of the desired level to which the mechanisms of the illustrative embodiments are to be implemented in a particular data processing system is identified and used to determine how to adjust the operating parameters. The desired level setting may be stored, for example, in a non-volatile memory of the data processing system which is accessible by the firmware 290. This desired level setting may be set, for example, via the operating system, from a BIOS menu, or the like. Other mechanisms for storing and providing a desired level setting to the firmware 290 may be used without departing from the spirit and scope of the present invention.

As an example of such a desired level setting, a system administrator may select a particular level for use from a set of predefined levels, e.g., High (H), Medium (M), or Low (L). The H level setting may be used for specifying that the firmware will set all of the endpoints to their maximum data rate levels, thereby effectively disabling the mechanisms of the illustrative embodiment for balancing bandwidth. The L level setting may be used for specifying that the firmware should adjust the data rate levels of the endpoints so that their total data rate matches that of the maximum data rate of the front-side bus. The M level setting may be used for specifying that the firmware should adjust the data rate levels of the endpoints so that their total data rate matches a selected value that exceeds the maximum data rate of the front-side bus but is less than the total maximum data rate of all of the endpoints. For example, the data rate may be set to twice the maximum data rate of the front-side bus, three times the maximum data rate of the front-side bus, or any other multiple or non-multiple value of the maximum data rate of the font-side bus.

These table data structures and the user selected balance level, e.g., H, M, or L, are used to adjust the balance of bandwidth of a bus across PCIe endpoints. The balancing of the bandwidth by the firmware may be performed, for example, upon initialization of the data processing system, in response to the addition of a PCIe endpoint to the data processing system, in response to a system administrator command to perform the bandwidth balancing of the illustrative embodiment, in response to a detected condition of the data processing system, e.g., a desired performance level, such as a data throughput, not meeting a required level, in response to the occurrence of a particular event, in response to a schedule of bandwidth balancing operations, or the like. Once it is determined that a bandwidth balancing operation is to be performed, the mechanisms of the illustrative embodiments operate to balance the bandwidth of a front-side bus across the PCIe endpoints as discussed hereafter with regard to FIG. 3.

FIG. 3 is an exemplary diagram of the primary operational components of the illustrative embodiments. As shown in FIG. 3, firmware 310 operates in conjunction with a first table data structure storage device 320, a second table data structure storage device 330, a user bandwidth balancing level storage device 340, and configuration data structure storage devices 350-354 associated with firmware of PCIe endpoints 360-364, to modify the operating parameters, e.g., payload, lanes, MMRS, of the PCIe endpoints 360-364 to balance the bandwidth of the front-side bus 370 across the PCIe endpoints 360-364.

In operation, the firmware 310 determines the maximum data rate for the front-side bus 370. The maximum data rate for the front-side bus 370 may be determined, for example, by reading a register of the data processing system that stores the maximum data rate value and which is accessible by the firmware 310. In other illustrative embodiments, the maximum data rate for the front-side bus 370 may be passed into the system via system vital product data (VPD). For example, the system VPD identifies the bus speed of the front-side bus 370. From this bus speed, the firmware 310 may determine the maximum data rate. Alternatively, the system VPD may identify the maximum data rate itself. Other mechanisms for providing the maximum data rate for the front-side bus 370 may be used without departing from the spirit and scope of the present invention.

Having identified the maximum data rate of the front-side bus 370, the firmware 310 then queries all of the currently attached PCIe endpoints 360-364 and determines what each PCIe endpoint's maximum number of lanes, MMRS, and payload are from their configuration data structure storage devices 350-354. The number of lanes, or the lane size, may be determined when a PCIe slot is powered on and the bus width is negotiated via hardware mechanisms. The firmware 310 may identify the current number of lanes or lane size by reading a standard hot-plug controller (SHPC) register provided in the system, for example. The firmware 310 may modify the number of lanes or the lane size by modifying the SHPC registers to set the largest lane size to which the PCIe slot can be configured and then the firmware 310 may force a slot reconfiguration via SHPC registers to force a re-negotiation but this time with a limit on the number of lanes or lane size. The MMRS and payload settings are industry standard PCI registers that are initialized by the firmware 310.

The firmware 310 then uses the first table data structure, which maps data rates to combinations of operational parameters, such as payload, number of lanes, and MMRS, stored in the first table data structure storage device 320 to determine the maximum data rate for each of the PCIe endpoints 360-364. The maximum data rate for each of the PCIe endpoints 360-364 is determined based on the maximum lane, MMRS, and payload values retrieved from the configuration data structure storage devices 350-354 of the PCIe endpoints 360-364. The maximum data rates for each of the PCIe endpoints 360-364 may then be totaled or summed up to generate a total maximum data rate for all PCIe endpoints 360-364.

Having determined the total maximum data rate for all of the PCIe endpoints 360-364, the firmware 310 compares the maximum data rate for all of the PCIe endpoints 360-364 to the maximum data rate for the front-side bus 370, as determined by the firmware 310. If the maximum data rate for all of the PCIe endpoints 360-364 is less than or equal to the maximum data rate for the front-side bus 370, then all of the PCIe endpoints' operational parameters are set to their values corresponding to a maximum data rate. That is, the settings for payload, number of lanes, and MMRS corresponding to the maximum data rate for the PCIe endpoint in the first table data structure are used to set the operational parameters of the PCIe endpoints 360-364 in their respective configuration data structure storage devices 350-354. It should be noted that each PCIe endpoint 360-364, through this operation, may have a different setting of operational parameters based on their individual maximum data rates.

If the maximum data rate for all of the PCIe endpoints 360-364 exceeds the front-side bus' maximum data rate, then the level selected by the user, i.e. the user selected bandwidth balance level stored in the user bandwidth balancing level storage device 340, is retrieved and used to determine how to balance the bandwidth of the front-side bus 370 amongst the PCIe endpoints 360-364.

If the user, e.g., system administrator, has selected a High (H) operational level, then all of the PCIe endpoints 360-364 are set to use their maximum data rate. If the user has not selected the H operational level, then the second table data structure in the second table data structure storage device 330 is consulted to determine what the minimum data rate is for each PCIe endpoint 360-364. If a particular PCIe endpoint 360-364 does not exist in the second table data structure, then a class code associated with the PCIe endpoint 360-364, which may be retrieved from an industry standard register in the PCIe endpoint 360-364, may be used to match it with a similar PCIe endpoint that is represented in the second table data structure. If a similar PCIe endpoint cannot be found based on the class code, then the minimum data rate may be assumed to be the maximum data rate for the PCIe endpoint 360-364 but the priority of the PCIe endpoint 360-364 may be reduced to a low priority since the PCIe endpoint 360-364 is one that is not supported by the data processing system.

The minimum data rates for all of the PCIe endpoints 360-364 may be summed and used to compare against a data rate for the front-side bus 370 as determined based on the maximum data rate of the front-side bus 370 and the user's selection of a level of operation of the bandwidth balancing mechanism, e.g., L or M. For example, a determination may be made by the firmware 310 as to whether the total minimum data rates for all of the PCIe endpoints 360-364 is equal to or less than the front-side bus 370 maximum data rate (for a setting of L) or equal to or less than twice the front-side bus 370 maximum data rate (for a setting of M). If the total minimum data rates for all of the PCIe endpoints 360-364 is equal to or less than a corresponding level of front-side bus 370 data rate, then the data rates are acceptable and the first table data structure is used, based on the minimum data rates, to identify the settings for payload, MMRS, and lanes that are to be used by the PCIe endpoints 360-364. The firmware 310 may then use these operational parameters to determine how to modify the configuration settings in the configuration data structure storage devices 350-354 of each of the PCIe endpoints 360-364. The modification to the configuration of the PCIe endpoints 360-364 is primarily performed using the MMRS or payload parameters because changing lanes requires a reset and retraining of the endpoint.

If the total minimum data rate for all of the PCIe endpoints 360-364 is not less than or equal to the set level data rate of the front-side bus 370, then there are a number of options that may be used to achieve acceptable performance of the PCIe endpoints 360-364. As a first option, the configuration of the PCIe endpoints 360-364 may be set by the firmware 310 using the operational parameters determined from the first table data structure based on the minimum data rates of the PCIe endpoints 360-364 regardless of whether or not the total minimum data rate for all of the PCIe endpoints 360-364 is less than the set level data rate of the front-side bus 370. An error message may be sent to an administrator indicating the problem so that the administrator may take steps to ensure that a desired performance of the data processing system is achieved.

As a second option, a priority list may be generated that lists the PCIe endpoints 360-364 in a priority ranked order with unknown or unsupported endpoints being listed at a lowest priority in the list. The firmware 310 may then operate to cut-back on resources, i.e. bandwidth, for each PCIe endpoint 360-364 where the percentage dropped is based on where the PCIe endpoint 360-364 is in the priority list. This cut-back operation may be performed until a desired goal is achieved, e.g., a total data rate of the PCIe endpoints 360-364 is equal to or less than the set level data rate of the front-side bus 370. In some illustrative embodiments, the amount by which a PCIe endpoint's resources may be cut-back may be limited to a particular amount relative to its minimum data rate, e.g., half the PCIe endpoint's minimum data rate. In some illustrative embodiments, the resources of the PCIe endpoints 360-364 may be cut-back in the manner described above along with an increase in the set level data rate of the front-side bus 370, e.g., twice the set level data rate of the front-side bus 370 (for a setting of L) or four times the set level data rate of the front-side bus 370 (for a setting of M). This allows a compromise between the PCIe endpoints 360-364 being limited below their minimum data rates but not already down to the L or M front-side bus 370 limits. In any of these illustrative embodiments, an error message may be sent to an administrator indicating the problem so that the administrator may take steps to ensure that a desired performance of the data processing system is achieved.

With isochronous PCIe endpoints 360-364, the PCIe endpoint 360-364 may or may not want a high data rate but, either way, wants a predictable time to meet certain data rate requirements. For example, the isochronous PCIe endpoint 360-364 may require that the PCIe endpoint 360-364 complete a direct memory access (DMA) write or read operation within a specific time frame.

One way to allow PCIe endpoints 360-364 to gain access to the front-side bus 370 sooner is by allowing the PCIe endpoint 360-364 to have priority over other non-isochronous PCIe endpoints 360-364. Another is to prevent other non-isochronous PCIe endpoints 360-364 from using the front-side bus 370 for long data transfers. The length of a data transfer is dependent on the size of the payload. The time to transfer a particular payload is a predictable time.

Thus, with the mechanisms of the illustrative embodiments, once the firmware 310 establishes data rates in the manner previously described above, the firmware 310 may make adjustments for isochronous issues. As discussed above, the second table data structure includes information identifying which PCIe endpoint types, if any, are isochronous. The firmware 310 of the illustrative embodiments may check the second table data structure to determine which of the currently installed PCIe endpoints 360-364 have isochronous issues, if any, e.g., PCIe endpoint 360. Assuming that a PCIe endpoint 360 that has isochronous issues is found, the firmware 310 checks the second table data structure to determine what the minimum time requirement is for the PCIe endpoint 360 and what the priority of the PCIe endpoint 360 is.

If the PCIe endpoint 360 has the highest priority for all currently installed PCIe endpoints 360-364, and if the system supports PCIe endpoint 360-364 priority settings, then a bus arbiter 390 is set so that this PCIe endpoint 360 always gets priority. Based on the information in the first table data structure, it is known how long it takes for each payload size to be processed across the front-side bus 370. The time to process a payload may be calculated based on the values obtained from the first table data structure. Alternatively, the time to process a payload may be determined by performing a lookup operation of empirically obtained processing time values based on the information retrieved from the first table data structure.

Having determined the time it takes for each payload size to be processed across the front-side bus 370, it is possible to determine what the ideal payload size is to allow other PCIe endpoints 360-364 to complete in time for this PCIe endpoint 360 to meet its isochronous requirements. For example, assume a first PCIe endpoint or adapter, i.e. adapter A, must wait for PCIe endpoints or adapters B, C, and D to send their packets before it may access the front-side bus 370. Adapter A thus, has to wait a time period required for processing the header, the payload, the cyclic redundancy check (CRC) value, and for performing arbitration for the front-side bus 370. As one example, the header may be 12-16 bytes, the CRC value may be 4 bytes, and the arbitration may be 2 clock cycles. Not counting the arbitration time period, the adapter A would have to wait the time it takes to send 12336 bytes with a payload=4096 or 432 bytes with a payload=128. The time it takes to send this much payload data is also dependent on the number of lanes, or lane size. Thus, the ideal payload size is deterministic and can be calculated. Including arbitration in the calculation adds additional possible combinations of settings for making sure that isochronous requirements are met, i.e. whether adapter A gets priority over other adapters, whether arbitration is performed round-robin, or the like.

Having determined the ideal payload size, the firmware 310 may then determine if any of the other PCIe endpoints 362-364 have their payload size set to a higher value than the ideal payload size. If so, then the first table data structure is consulted to see if the number of lanes for those PCIe endpoints 362-364 may be modified, the MMRS setting modified, and/or the payload settings may be modified to a value that will still meet the minimum data rates for those PCIe endpoints 362-364 with this lower payload. If so, then the settings for the PCIe endpoints 362-364 are so adjusted. If the PCIe endpoints 362-364 that are using too large a payload are a lower priority than the PCIe endpoint 360 with isochronous issues, then the lower priority PCIe endpoints' 362-364 payload size is degraded by a first incremental amount.

If the PCIe endpoint 362-364 that is using too large a payload is a higher priority PCIe endpoint than the PCIe endpoint 360 with isochronous issues, then its payload settings are not modified since it has a higher priority than the isochronous PCIe endpoint 360. Ideally, isochronous PCIe endpoints 360 will have a higher priority than non-isochronous PCIe endpoints 362-364 and thus, this situation will be rare.

Figures 4A, 4B, 4C:
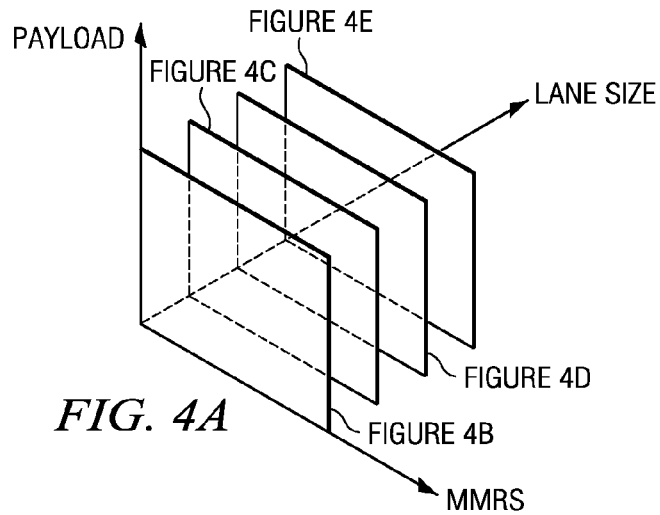

FIGS. 4A-4E are exemplary diagrams of a first three-dimensional table data structure for identifying possible combinations of operational parameters for balancing bandwidth across PCIe endpoints in accordance with one illustrative embodiment. Because it can be difficult to visualize a three-dimensional table data structure, FIGS. 4A-4E are provided as a series of two-dimensional tables that together may be combined to generate a three-dimensional table data structure for Read operations of PCIe endpoints. FIG. 4A represents how FIGS. 4B-4E may be combined in a three-dimensional manner to generate the three-dimensional table data structure. Each of the two-dimensional table data structures shown in FIGS. 4B-4E are for different numbers of lanes, or lane sizes, supported by PCIe endpoints, e.g., ×1, ×2, ×4, or ×8.

FIG. 4F is provided as an example of a two-dimensional table data structure that may be used for Write operations of PCIe endpoints. A single two-dimensional table data structure is shown for Write operations because for Write operations there are only two parameters that may be altered to achieve different data rates, i.e. payload size and number of lanes, since the MMRS refers to the maximum memory read size which cannot be changed to achieve a different Write operation data rate. It should be appreciated that setting values of these table data structures may be combined to provide a three-dimensional plot of one or more curves representing the various settings for achieving desired data rates.

The table diagrams in FIGS. 4A-4F illustrate that a particular data rate goal may be achieved by using multiple options. For example, if one needs a data rate of 1760 Mbytes/second, then various combinations of settings may be used as a basis for obtaining that data rate. For example, a combination of settings including 8 lanes (×8 in FIG. 4E), a payload size of 256 bytes, and a MMRS of 4096 bytes may be utilized. Similarly, a combination of 8 lanes, payload size of 512 bytes, and a MMRS of 512 bytes may also be used. One might prefer the MMRS of 512 bytes and payload size of 512 bytes in order to spread the bandwidth across the PCIe endpoints. However, for isochronous reasons, smaller payload sizes may be better and thus, a MMRS of 4096 bytes and a smaller payload size of 256 bytes may be used if isochronous issues exist for a particular configuration.

FIG. 5 is an exemplary diagram of a second table data structure for identifying supported PCIe endpoints and whether the PCIe endpoints have isochronous requirements. It should be appreciated that FIG. 5 is only exemplary and that the identification of supported PCIe endpoints and isochronous requirements may be performed in many different ways. Thus, many modifications to the diagram shown in FIG. 5 may be made without departing from the spirit and scope of the present invention.

The second table data structure 500 in FIG. 5 shows, among other information, the priority level 510 of the PCIe endpoints, a class 520 and subclass 530 of the PCIe endpoint, an ideal data rate 540 for the PCIe endpoint, a minimum data rate for the PCIe endpoint 550, and whether the PCIe endpoint has isochronous requirements 560. The information in columns 2-4 of the exemplary second table data structure 500 are used to provide vendor/device identifiers and subsystem vendor/device identifiers. Every PCIe endpoint has a unique vendor/device identifier. Some PCIe endpoints have subsystem vendor/device identifiers. When firmware walks the PCIe bus of the data processing system, the firmware reads these identifiers to determine which PCIe endpoint has been discovered.

The priority level 510 identifies the priority of the corresponding PCIe endpoint. If multiple PCIe endpoints have the same priority, then they have the same priority value in priority level column 510. For example, as shown in FIG. 5, the Ethernet endpoints have the same priority and the SCSI and IDE endpoints have the same priority.

The class 520 and subclass 530 allows the firmware to determine the type of the PCIe endpoint. The firmware uses the class 520 and subclass 530 to determine the priority and isochronous requirements of an endpoint that is not in the second table data structure. For example, if the firmware cannot find a particular Ethernet endpoint (via class code) that is not in the table data structure 500, then the firmware may use the settings for another Ethernet endpoint that is in the table data structure 500.

Moreover, if a particular endpoint is not found in the table data structure 500, but there is an endpoint in the table data structure 500 from the same vendor, then the firmware may choose to use the same settings as specified for the endpoint from the same vendor. For example, assume that the table data structure 500 includes a value for an Emulex Fibre Channel Adapter card. Further assume that the firmware discovers another adapter from Emulex with a different device identifier. The different identifier may be different, for example, because the other adapter is an older or newer version of the one in the table data structure 500. In this case, the firmware may choose to use the table data structure 500 value for the other Emulex adapter. The firmware may further perform a second check to see if the class/subclass 520/530 are similar and only if they are, use the value in the table 500 with the other Emulex adapter. In this way, an amount of flexibility is provided with the use of the table data structure 500 such that the table data structure 500 is not strictly required to be updated with every new identifier encountered.

Figure 6A:
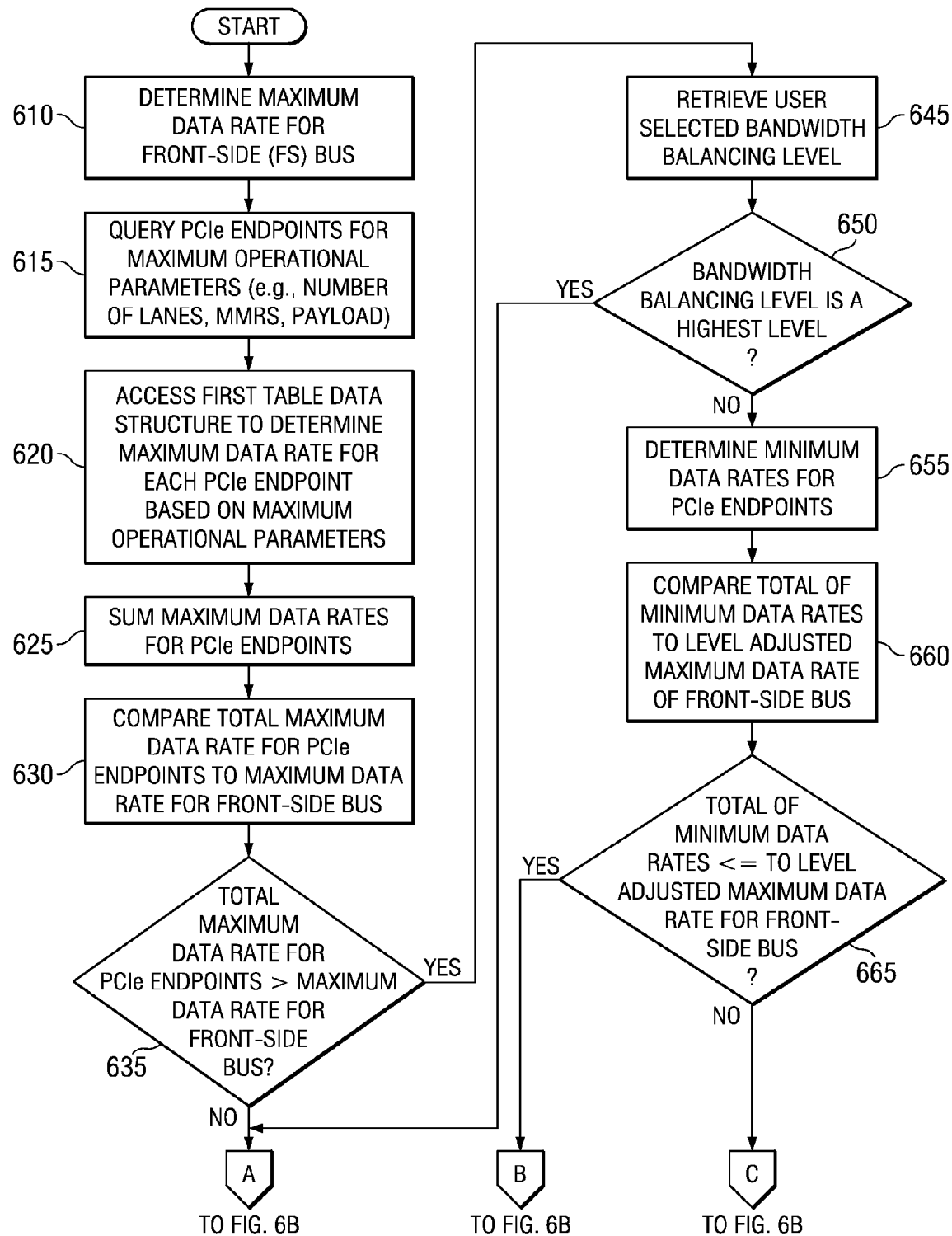
FIGS. 6A-6B are flowcharts outlining an exemplary operation for determining a setting of operational parameters for a PCIe endpoint in order to balance bandwidth in accordance with one illustrative embodiment.
Figure 6B:
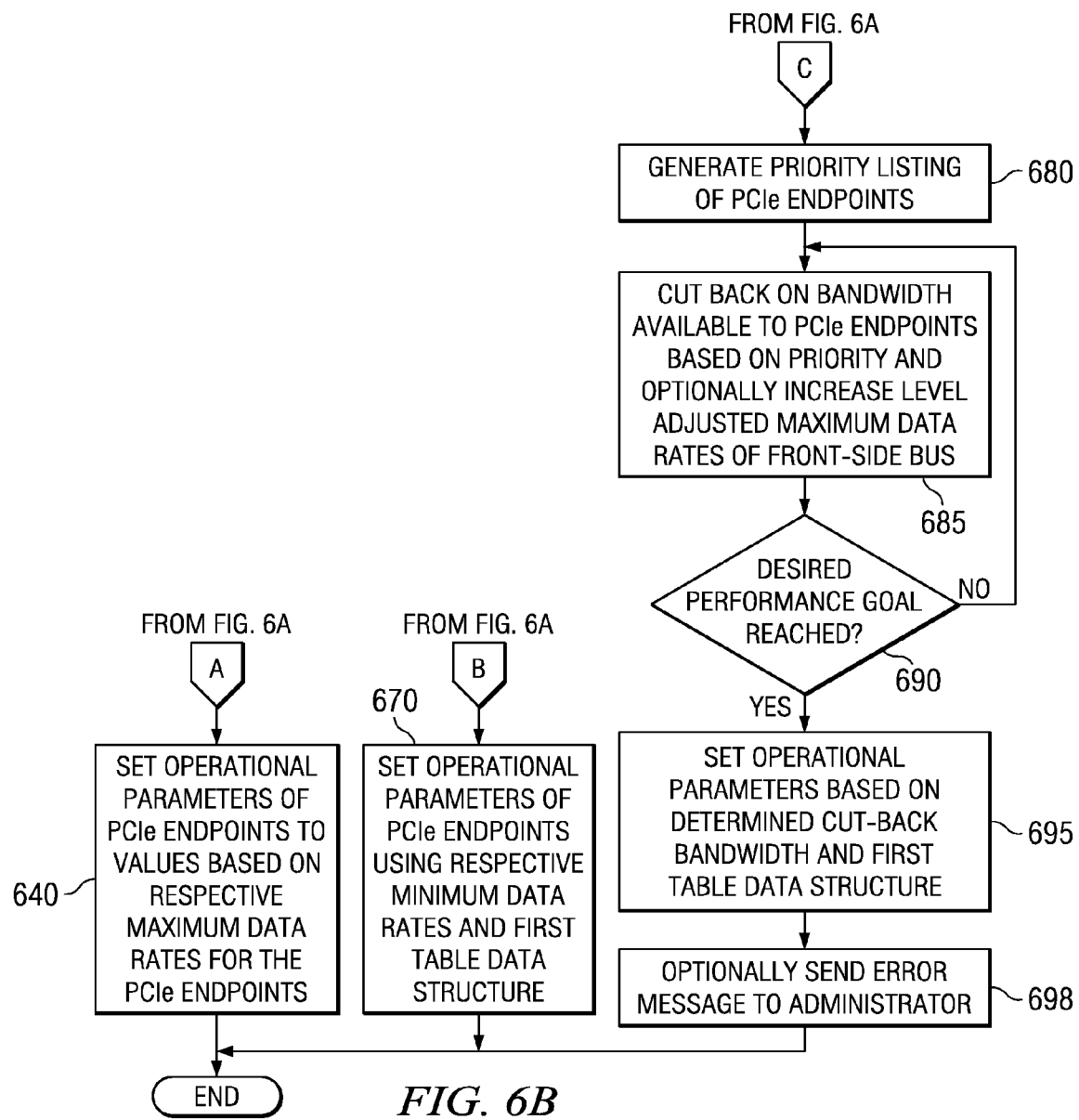
Figure 7:
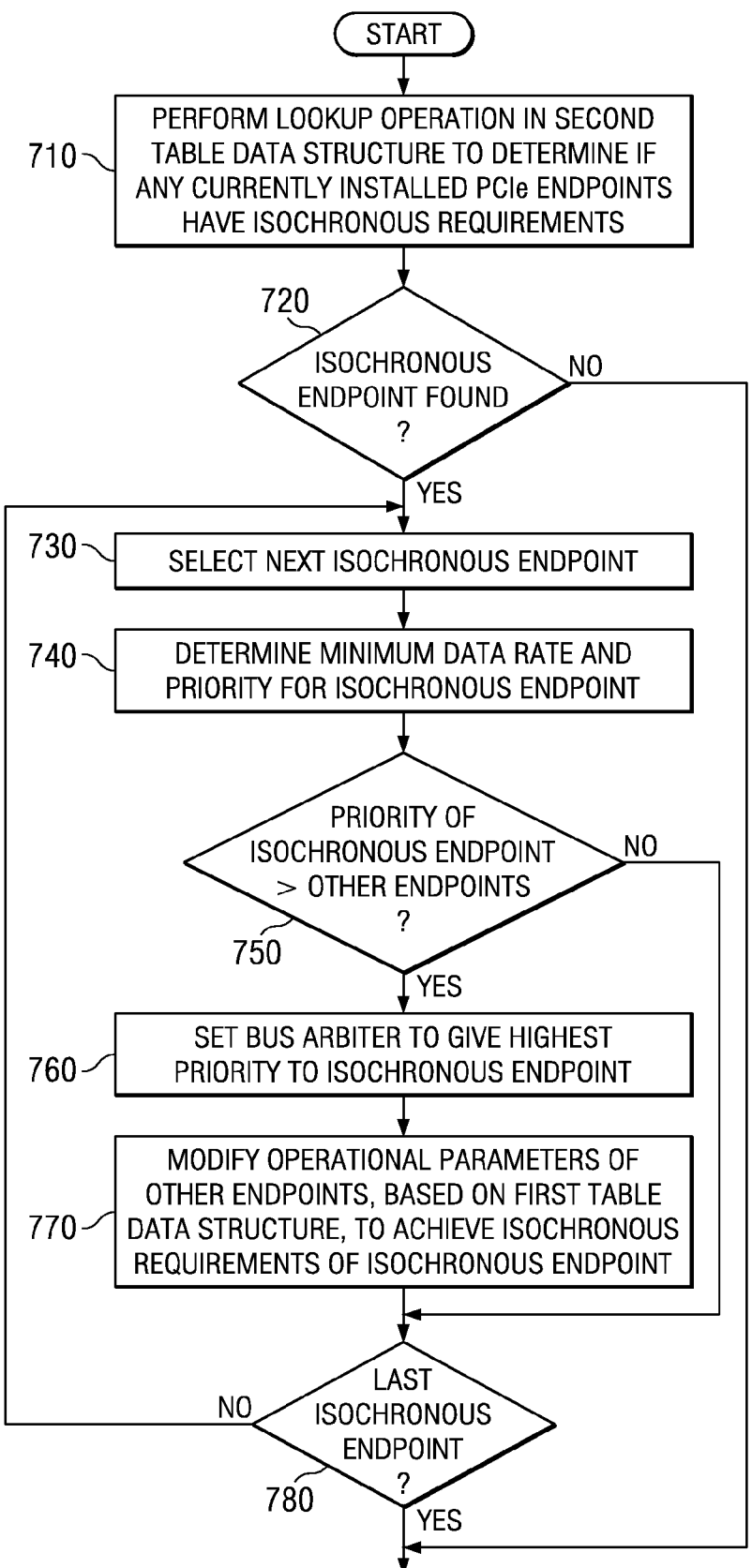
FIG. 7 is a flowchart outlining an exemplary operation for adjusting operational parameters for a PCIe endpoint that has isochronous requirements in order to balance bandwidth in accordance with one illustrative embodiment.

FIGS. 6A-6B and 7 are flowcharts that outline exemplary operations for balancing bandwidth across PCIe endpoints in accordance with one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIGS. 6A-6B are flowcharts outlining an exemplary operation for determining a setting of operational parameters for a PCIe endpoint in order to balance bandwidth in accordance with one illustrative embodiment. As shown in FIGS. 6A-6B, the operation starts with the firmware determining a maximum data rate for the front-side bus (step 610). The firmware queries the currently installed PCIe endpoints for their maximum number of lanes, maximum MMRS, and maximum payload configuration parameters (step 615). The firmware performs a lookup operation in a first table data structure based on the maximum number of lanes, MMRS, and payload for each PCIe endpoint to identify the maximum data rate for the PCIe endpoints (step 620).

The firmware sums the maximum data rates for each of the PCIe endpoints (step 625) and compares the total maximum data rate for the PCIe endpoints to the maximum data rate for the front-side bus (step 630). The firmware determines if the total maximum data rate for the PCIe endpoints is greater than the maximum data rate for the front-side bus (step 635). If not, the firmware sets the operational parameters of the PCIe endpoints to values corresponding to their respective maximum data rates (step 640) and the operation terminates.

If the total maximum data rate for the PCIe endpoints is greater than the maximum data rate for the front-side bus, then the firmware retrieves a user selected bandwidth balancing level (step 645). The firmware determines if the user selected bandwidth balance level is at a highest level (step 650). If so, then the operation goes to step 640 where the operational parameters for the PCIe endpoints are set based on the maximum data rate for the PCIe endpoints. If the bandwidth balance level is not the highest level, then the firmware calculates a level adjusted maximum data rate for the front-side bus based on the user selected bandwidth balancing level and determines the minimum data rates for the endpoints based on a second data structure that stores the minimum data rates for various PCIe endpoint types, priorities of the various PCIe endpoint types, as well as information about which PCIe endpoint types have isochronous requirements (step 655).

The firmware compares the total of the minimum data rates for the PCIe endpoints to the level adjusted maximum data rate of the front-side bus (step 660). The firmware determines if the total minimum data rate for the PCIe endpoints is less than or equal to the level adjusted maximum data rate of the front-side bus (step 665). If so, the firmware sets the operational parameters of the PCIe endpoints to values corresponding to their respective minimum data rates using the first table data structure, which correlates operational parameters, e.g., MMRS, number of lanes, and payload size, to particular data rates (step 670). The operation then terminates.

If the total minimum data rate of the PCIe endpoints is not less than or equal to the level adjusted maximum data rate of the front-side bus, then a number of different operations may be performed as previously described above. For purposes of the example shown in FIGS. 6A-6B, the operation performed involves the firmware generating a priority listing of the PCIe endpoints based on the priority information in the second data structure (step 680). The firmware then cuts back on bandwidth of the front-side bus available to the PCIe endpoints based on the priority listing (step 685). Optionally, the level adjusted maximum data rate of the front-side bus may be increased as well. This cutting back and optional increasing of the front-side bus level adjusted maximum data rate may be continued until a desired performance goal is reached, e.g., the total bandwidth made available to the PCIe endpoints being equal to or less than the level adjusted maximum data rate of the front-side bus (step 690).

Once the performance goal is reached, the firmware sets the operational parameters based on the determined data rates for the PCIe endpoints and the corresponding parameter values specified in the first table data structure (step 695). The particular combination of data values is primarily selected based on the maximum MMRS of the various options, and then the maximum payload size, and finally the number of lanes, since changing the number of lanes requires a reboot of the system. Since the total minimum data rate of the PCIe endpoints was not less than or equal to the level adjusted maximum data rate of the front-side bus, the firmware may send an error message to an administrator workstation or the like to inform the administrator of a potential problem with the setting of the PCIe endpoint operational parameters (step 698). The operation then terminates.

FIG. 7 is a flowchart outlining an exemplary operation for adjusting operational parameters for a PCIe endpoint that has isochronous requirements in order to balance bandwidth in accordance with one illustrative embodiment. As shown in FIG. 7, the operation starts with the firmware performing a lookup operation in the second table data structure to determine if any currently installed PCIe endpoints of the data processing system have isochronous requirements (step 710). The firmware determines if an isochronous PCIe endpoint was found (step 720). If not, the operation terminates.

If an isochronous PCIe endpoint is found, the firmware selects the next one of the isochronous PCIe endpoints (step 730) and determines a minimum data rate and priority of the isochronous endpoint based on the information in the second table data structure (step 740). The firmware determines if the priority of the isochronous PCIe endpoint is greater than the priority of the other PCIe endpoints in the data processing system (step 750). If so, the firmware sets a bus arbiter to give the highest priority to the isochronous endpoint (step 760). The firmware then modifies the operational parameters of the other PCIe endpoints so as to achieve the isochronous requirements of the isochronous PCIe endpoint based on the information stored in the first table data structure (step 770).

Thereafter, or if the priority of the isochronous PCIe endpoint is not greater than the other PCIe endpoints (step 750), the firmware determines if this is the last isochronous PCIe endpoint found in the data processing system (step 780). If not, the operation returns to step 730. If this is the last isochronous PCIe endpoint found in the data processing system, the operation terminates.

Thus, the illustrative embodiments provide mechanisms for automatically adjusting the operational parameters of PCIe endpoints based on their maximum and/or minimum data rates and the maximum data rate of a front-side bus. The illustrative embodiments permit the front-side bus to be fully utilized and its bandwidth balanced over a plurality of PCIe endpoints of the data processing system while minimizing isochronous requirement issues and situations where the performance of the PCIe endpoints cannot be guaranteed due to the front-side bus bandwidth being exceeded.

It should be noted that while the above illustrative embodiments are described in terms of firmware being the primary operational element for implementing the functionality of the present invention, the present invention is not limited to such. Rather, as noted above, the mechanisms of the illustrative embodiments may be implemented in hardware, software, or any combination of hardware and software, without departing from the spirit and scope of the present invention.

Furthermore, while specific examples of operational parameters of PCIe endpoints, e.g., MMRS, number of lanes, and payload size, are used in the description of the illustrative embodiments, the present invention is not limited to only the use of these particular operational parameters. Other operational parameters may be used in table data structures or the like to achieve the purposes of the illustrative embodiments and the present invention. Moreover, table data structures are not required by the illustrative embodiments and the information attributed to table data structures in the above description may be provided in various other forms other than a table without departing from the spirit and scope of the present invention.

In addition, while the illustrative embodiments are described with particular application to PCIe endpoints or adapters, the illustrative embodiments are not limited to such. Rather, the mechanisms of the illustrative embodiments may be used to balance bandwidth of any type of bus or data traffic mechanism across endpoints or sources/sinks of data. For example, endpoints or adapters that utilize other protocols, other than PCIe, may be the subject of the mechanisms of the illustrative embodiments without departing from the spirit and scope of the present invention.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for balancing a bandwidth of a front-side bus of the data processing system across a plurality of endpoints coupled to the data processing system, comprising:
   determining a maximum data rate of the front-side bus;
   determining a total maximum data rate of the plurality of endpoints;
   comparing the total maximum data rate of the plurality of endpoints to the maximum data rate of the front-side bus; and
   in response to the total maximum data rate of the plurality of endpoints being greater than the maximum data rate of the front-side bus:
      retrieving minimum data rates, different from the maximum data rates, for the plurality of endpoints; and
      setting operational parameters of the plurality of endpoints based on the minimum data rates of the plurality of endpoints.

2. The method of claim 1, wherein determining the maximum data rate of the front-side bus comprises at least one of retrieving the maximum data rate value from a register of the data processing system that stores the maximum data rate value or receiving a value corresponding to the maximum data rate of the front-side bus as part of vital product data.

3. The method of claim 1, wherein determining the total maximum data rate of the plurality of endpoints comprises querying each of the endpoints in the plurality of endpoints for their current operational parameter settings, determining a maximum data rate for each endpoint of the plurality of endpoints based on their current operational parameter settings, and calculating the total maximum data rate as a sum of the maximum data rates for each of the endpoints of the plurality of endpoints.

4. The method of claim 3, wherein querying each of the endpoints in the plurality of endpoints comprises obtaining the operational parameter settings of an endpoint from industry standard registers whose values are populated in response to a slot corresponding to the endpoint being powered on.

5. The method of claim 3, wherein determining the maximum data rate for each endpoint of the plurality of endpoints based on their current operational parameter settings comprises:
   performing, for each of the endpoints in the plurality of endpoints, a lookup operation using a first data structure identifying a correlation between settings of one or more operational parameters and the maximum data rate.

6. The method of claim 5, wherein the first data structure is a three-dimensional data structure correlating a number of lanes operational parameter, a payload size operational parameter, and a maximum memory read size operational parameter with the maximum data rate.

7. The method of claim 1, wherein if the total maximum data rate of the plurality of endpoints is less than or equal to the maximum data rate of the front-side bus, operational parameters of each endpoint of the plurality of endpoints are set to values corresponding to each endpoint's maximum data rate.

8. The method of claim 1, wherein retrieving the minimum data rates for the plurality of endpoints comprises:
   performing, for each of the endpoints in the plurality of endpoints, a lookup operation using a second data structure identifying a correlation between endpoint type, endpoint priority, minimum data rate, and whether an endpoint has isochronous requirements.

9. The method of claim 1, wherein setting the operational parameters of the plurality of endpoints based on the minimum data rates of the plurality of endpoints comprises:
   retrieving a user bandwidth balancing level value;
   determining an adjusted data rate for the front-side bus based on the maximum data rate of the front-side bus and the user bandwidth balancing level value;
   comparing a total of the minimum data rates of the plurality of endpoints with the adjusted data rate for the front-side bus; and
   setting the operational parameters of the plurality of endpoints based on a result of the comparison of the total of the minimum data rates of the plurality of endpoints with the adjusted data rate for the front-side bus.

10. The method of claim 9, wherein if the total of the minimum data rates of the plurality of endpoints is less than or equal to the adjusted data rate for the front-side bus, setting the operational parameters of the plurality of endpoints based on the result of the comparison of the total of the minimum data rates of the plurality of endpoints with the adjusted data rate for the front-side bus comprises:
   setting the operational parameters for each endpoint by performing a lookup operation in a first data structure, identifying a correlation between settings of one or more operational parameters and a data rate, based on a minimum data rate corresponding to the endpoint.

11. The method of claim 9, wherein if the total of the minimum data rates of the plurality of endpoints is greater than the adjusted data rate for the front-side bus, setting the operational parameters of the plurality of endpoints based on the result of the comparison of the total of the minimum data rates of the plurality of endpoints with the adjusted data rate for the front-side bus comprises:
   setting the operational parameters for each endpoint based on a lookup operation in the first data structure using a corresponding minimum data rate; and
   sending an error message to an administrator data processing device indicating a problem in configuring the data processing system.

12. The method of claim 9, wherein if the total of the minimum data rates of the plurality of endpoints is greater than the adjusted data rate for the front-side bus, setting the operational parameters of the plurality of endpoints based on the result of the comparison of the total of the minimum data rates of the plurality of endpoints with the adjusted data rate for the front-side bus comprises:
   generating a priority listing of the endpoints in the plurality of endpoints based on priority information retrieved from a second data structure identifying endpoint priority; and
   reducing resources allocated to the endpoints based on the priority listing until a total minimum data rate of the plurality of endpoints is less than or equal to the adjusted data rate for the front-side bus.

13. The method of claim 12, wherein the method is implemented in firmware of the data processing system.

14. The method of claim 8, further comprising:
identifying one or more endpoints in the plurality of endpoints that have isochronous requirements based on the second data structure;
determining if the one or more endpoints have a highest priority based on the second data structure; and
setting a bus arbiter such that the one or more endpoints are given priority to the front-side bus over other endpoints of the plurality of endpoints.

15. The method of claim 14, further comprising:
determining a time to process a payload size corresponding to the operational parameter setting for the one or more endpoints based on the first data structure;
determining an ideal payload size for the plurality of endpoints to compensate for the isochronous requirements of the one or more endpoints; and
adjusting operational parameters of endpoints in the plurality of endpoints whose payload size setting is greater than the ideal payload size.

16. A computer program product comprising a computer useable storage medium having a computer readable program stored thereon, wherein the computer readable program, when executed on a computing device, causes the computing device to:
determine a maximum data rate of a front-side bus;
determine a total maximum data rate of a plurality of endpoints;
compare the total maximum data rate of the plurality of endpoints to the maximum data rate of the front-side bus; and
in response to the total maximum data rate of the plurality of endpoints being greater than the maximum data rate of the front-side bus:
retrieve minimum data rates, different from the maximum data rates, for the plurality of endpoints; and
set operational parameters of the plurality of endpoints based on the minimum data rates of the plurality of endpoints.

17. The computer program product of claim 16, wherein the computer readable program causes the computing device to determine the maximum data rate of the front-side bus by at least one of retrieving the maximum data rate value from a register of the data processing system that stores the maximum data rate value or receiving a value corresponding to the maximum data rate of the front-side bus as part of vital product data.

18. The computer program product of claim 16, wherein the computer readable program causes the computing device to determine the total maximum data rate of the plurality of endpoints by querying each of the endpoints in the plurality of endpoints for their current operational parameter settings, determining the maximum data rate for each endpoint of the plurality of endpoints based on their current operational parameter settings, and calculating the total maximum data rate as a sum of the maximum data rates for each of the endpoints of the plurality of endpoints.

19. The computer program product of claim 18, wherein the computer readable program causes the computing device to query each of the endpoints in the plurality of endpoints by obtaining the operational parameter settings of an endpoint from industry standard registers whose values are populated in response to a slot corresponding to the endpoint being powered on.

20. The computer program product of claim 18, wherein the computer readable program causes the computing device to determine the maximum data rate for each endpoint of the plurality of endpoints based on their current operational parameter settings by:
performing, for each of the endpoints in the plurality of endpoints, a lookup operation using a first data structure identifying a correlation between settings of one or more operational parameters and the maximum data rate.

21. The computer program product of claim 20, wherein the first data structure is a three-dimensional data structure correlating a number of lanes operational parameter, a payload size operational parameter, and a maximum memory read size operational parameter with the maximum data rate.

22. The computer program product of claim 16, wherein if the total maximum data rate of the plurality of endpoints is less than or equal to the maximum data rate of the front-side bus, operational parameters of each endpoint of the plurality of endpoints are set to values corresponding to each endpoint's maximum data rate.

23. The computer program product of claim 16, wherein the computer readable program causes the computing device to retrieve the minimum data rates for the plurality of endpoints by:
performing, for each of the endpoints in the plurality of endpoints, a lookup operation using a second data structure identifying a correlation between endpoint type, endpoint priority, minimum data rate, and whether an endpoint has isochronous requirements.

24. The computer program product of claim 16, wherein the computer readable program causes the computing device to set the operational parameters of the plurality of endpoints based on the minimum data rates of the plurality of endpoints by:
retrieving a user bandwidth balancing level value;
determining an adjusted data rate for the front-side bus based on the maximum data rate of the front-side bus and the user bandwidth balancing level value;
comparing a total of the minimum data rates of the plurality of endpoints with the adjusted data rate for the front-side bus; and
setting the operational parameters of the plurality of endpoints based on a result of the comparison of the total of the minimum data rates of the plurality of endpoints with the adjusted data rate for the front-side bus.

25. The computer program product of claim 24, wherein if the total of the minimum data rates of the plurality of endpoints is less than or equal to the adjusted data rate for the front-side bus, the computer readable program causes the computing device to set the operational parameters of the plurality of endpoints based on the result of the comparison of the total of the minimum data rates of the plurality of endpoints with the adjusted data rate for the front-side bus by:
setting the operational parameters for each endpoint by performing a lookup operation in a first data structure, identifying a correlation between settings of one or more operational parameters and a data rate, based on a minimum data rate corresponding to the endpoint.

26. The computer program product of claim 24, wherein if the total of the minimum data rates of the plurality of endpoints is greater than the adjusted data rate for the front-side bus, the computer readable program causes the computing device to set the operational parameters of the plurality of endpoints based on the result of the comparison of the total of the minimum data rates of the plurality of endpoints with the adjusted data rate for the front-side bus by:
setting the operational parameters for each endpoint based on a lookup operation in the first data structure using a corresponding minimum data rate; and sending an error message to an administrator data processing device indicating a problem in configuring the data processing system.

27. The computer program product of claim 24, wherein if the total of the minimum data rates of the plurality of endpoints is greater than the adjusted data rate for the front-side bus, the computer readable program causes the computing device to set the operational parameters of the plurality of endpoints based on the result of the comparison of the total of the minimum data rates of the plurality of endpoints with the adjusted data rate for the front-side bus by:
   generating a priority listing of the endpoints in the plurality of endpoints based on priority information retrieved from a second data structure identifying endpoint priority; and
   reducing resources allocated to the endpoints based on the priority listing until a total minimum data rate of the plurality of endpoints is less than or equal to the adjusted data rate for the front-side bus.

28. The computer program product of claim 27, wherein the computer program product is implemented in firmware of the computing device.

29. The computer program product of claim 23, wherein the computer readable program further causes the computing device to:
   identify one or more endpoints in the plurality of endpoints that have isochronous requirements based on the second data structure;
   determine if the one or more endpoints have a highest priority based on the second data structure; and
   set a bus arbiter such that the one or more endpoints are given priority to the front-side bus over other endpoints of the plurality of endpoints.

30. The computer program product of claim 29, wherein the computer readable program further causes the computing device to:
   determine a time to process a payload size corresponding to the operational parameter setting for the one or more endpoints based on the first data structure;
   determine an ideal payload size for the plurality of endpoints to compensate for the isochronous requirements of the one or more endpoints; and
   adjust operational parameters of endpoints in the plurality of endpoints whose payload size setting is greater than the ideal payload size.

31. A data processing system, comprising:
   firmware;
   a front-side bus; and
   a plurality of endpoints coupled to the firmware and the front-side bus, wherein the firmware:
   determines a maximum data rate of the front-side bus;
   determines a total maximum data rate of the plurality of endpoints;
   compares the total maximum data rate of the plurality of endpoints to the maximum data rate of the front-side bus; and
   in response to the total maximum data rate of the plurality of endpoints being greater than the maximum data rate of the front-side bus:
      retrieves minimum data rates, different from the maximum data rates, for the plurality of endpoints; and
      sets operational parameters of the plurality of endpoints based on the minimum data rates of the plurality of endpoints.

32. The system of claim 31, wherein the firmware determines the maximum data rate for each endpoint of the plurality of endpoints based on their current operational parameter settings by performing, for each of the endpoints in the plurality of endpoints, a lookup operation using a first data structure identifying a correlation between settings of one or more operational parameters and the maximum data rate, and wherein the first data structure is a three-dimensional data structure correlating a number of lanes operational parameter, a payload size operational parameter, and a maximum memory read size operational parameter with the maximum data rate.

33. The system of claim 32, wherein the firmware retrieves minimum data rates for the plurality of endpoints by performing, for each of the endpoints in the plurality of endpoints, a lookup operation using a second data structure identifying a correlation between endpoint type, endpoint priority, minimum data rate, and whether an endpoint has isochronous requirements.

34. The system of claim 33, wherein the firmware sets operational parameters of the plurality of endpoints based on minimum data rates of the plurality of endpoints by:
   retrieving a user bandwidth balancing level value;
   determining an adjusted data rate for the front-side bus based on the maximum data rate of the front-side bus and the user bandwidth balancing level value;
   comparing a total of the minimum data rates of the plurality of endpoints with the adjusted data rate for the front-side bus; and
   setting the operational parameters of the plurality of endpoints based on a result of the comparison of the total of the minimum data rates of the plurality of endpoints with the adjusted data rate for the front-side bus.

35. The system of claim 31, wherein the firmware further:
   identifies one or more endpoints in the plurality of endpoints that have isochronous requirements based on the second data structure;
   determines if the one or more endpoints have a highest priority based on the second data structure;
   sets a bus arbiter such that the one or more endpoints are given priority to the front-side bus over other endpoints of the plurality of endpoints;
   determines a time to process a payload size corresponding to the operational parameter setting for the one or more endpoints based on the first data structure;
   determines an ideal payload size for the plurality of endpoints to compensate for the isochronous requirements of the one or more endpoints; and
   adjusts operational parameters of endpoints in the plurality of endpoints whose payload size setting is greater than the ideal payload size.

* * * * *